United States Patent [19]

Mendrala

[11] 4,160,994

[45] Jul. 10, 1979

[54] LUMINANCE KEY AMPLIFIER

[75] Inventor: James A. Mendrala, San Fernando, Calif.

[73] Assignee: Sonex International Corp., Burbank, Calif.

[21] Appl. No.: 827,880

[22] Filed: Aug. 26, 1977

Related U.S. Application Data

[63] Continuation of Ser. No. 584,744, Jun. 7, 1975, abandoned, which is a continuation of Ser. No. 443,388, Feb. 19, 1974, abandoned.

[51] Int. Cl.² ............................................. H04N 9/535
[52] U.S. Cl. ....................................... 358/22; 358/34; 358/183
[58] Field of Search ............................ 358/22, 34, 183

[56] References Cited

U.S. PATENT DOCUMENTS

| | | | |
|---|---|---|---|
| 2,969,428 | 1/1961 | Wittlig | 358/183 |
| 2,972,012 | 2/1961 | Farber | 358/80 |
| 3,602,646 | 8/1971 | Goldberg | 358/183 |
| 3,622,694 | 11/1971 | Liu | 358/34 |
| 3,701,843 | 10/1972 | Hepner et al. | 358/34 |
| 3,778,542 | 12/1973 | Hanseman | 358/22 |
| 3,808,359 | 4/1974 | Scholz | 358/4 |

*Primary Examiner*—Robert L. Richardson
*Assistant Examiner*—Joseph A. Orsino, Jr.
*Attorney, Agent, or Firm*—Romney, Schaap, Golant, Scillieri, Disner & Ashen

[57] ABSTRACT

An electronic system for the purpose of generating special effects in both color TV and color motion pictures is disclosed. A luminance key amplifier determines the average strength of matrixed red, blue and green video signals from a foreground camera and compares the average with a reference value. Areas of the foreground image that cause the average strength of the color signals to exceed the reference value, such as white, cause the luminance key system to key the green, blue and red signals from a background source such as a camera to an encoder, a video tape recording system or a film recording system. When the average strength of the red, blue and green signals from the foreground camera is less than the reference value, such as black or gray, the luminance key amplifier responds by passing the color signals from the foreground camera only to the encoder, video tape recording system or film recording system.

22 Claims, 8 Drawing Figures

Fig. 2-A  BLUE SIGNAL AT OUTPUT OF CLAMP 64

Fig. 2-B  RED SIGNAL AT OUTPUT OF CLAMP 50

Fig. 2-C  GREEN SIGNAL AT OUTPUT OF CLAMP 76

Fig. 2-D  POSITIVE OUTPUT OF VIDEO SW. 112

Fig. 2-E  NEGATIVE OUTPUT OF VIDEO SW. 112

LUMINANCE KEY AMPLIFIER

RELATED APPLICATIONS

This application is a continuation of application Ser. No. 584,744, filed June 7, 1975, (now abandoned) which was a continuation of application Ser. No. 443,388, filed Feb. 19, 1974 (now abandoned.

BACKGROUND OF THE INVENTION

1. Field of the Invention

The present invention relates to electronic systems for generating special effects in color TV and color motion pictures and, more particularly, to a system using the luminance portion of one image to key in a second image to form a composite video picture.

2. History of the Prior Art

There presently exists the capability of keying out a portion of one image and replacing it was part or all of another image in television and motion picture systems. The "blue screen traveling matte" process, in various forms, has been known and successfully utilized by the motion picture industry for many years in the creation of special photographic effects. An electronic blue screen system known commercially as chroma key has, in spite of certain limitations, been widely used in commercial television production.

All traveling matte systems have certain common characteristics—the action phase is photographed against a colored backing or screen of high saturation, producing what is known as the foreground scene. By photographic (or, in the case of chroma key, electronic) systems and methods the color backing is removed from the foreground scene and is replaced by a background scene which is photographed separately. The final picture, therefore, contains (a) the foreground action that is photographed against the color backing, and (b) the background scene, combined photographically or electronically.

One example of a chroma key system is provided by U.S. Pat. No. 3,678,182, Boxman et al, Chroma Key Circuit, July 18, 1972. In the chroma key system a foreground camera may, for example, photograph a girl smoking a cigarette in front of a blue painted screen. The electronic chroma key device is capable of sensing specific colors and, in this case, would be adjusted to sense the blue of the background screen. The electronic signal thus derived from the blue screen portion of the foreground camera is utilized within the device to generate a "keying" signal which, in turn, is used in a television special effects amplifier to switch "off" the blue portions of the picture from the foreground camera, and simultaneously to switch "on" the background picture information generated by the second electronic camera. Because of the particular switching techniques used to combine the two camera signals, the system operates properly only when the blue background is uniformly lighted, and when edge transitions between the blue background and the foreground subject are particularly well defined. For this reason, the chroma key system does not sense fine details such as smoke, and it does not operate properly when transparent or semi-transparent materials appear with the subject in the foreground.

The relatively high brightness of the blue screen background used in traveling matte systems, combined with the optical flare introduced by all complex optical systems, particularly television zoom lenses, results in a false blue halo around objects appearing in front of the blue screen. A girl's black hair will, for example, have blue edges. A man's black suit will take a bluish cast.

In a system described in U.S. Pat. No. 3,778,542, Hanseman Blue Screen Traveling Matte System, Dec. 11, 1973, a subtraction concept rather than a switching technique is used to remove the blue background. The average of the red and green signals is derived and then electrically subtracted from the blue signal. The blue signal of the foreground camera as thus removed from the composite signal is replaced by signals from a background camera or other background source when it is desired to key the background image into the foreground image.

While traveling matte systems of the type described in the Hanseman patent provide certain improvements such as some reduction in the false blue halo and the ability to work with transparent objects in the images, such systems still suffer from a number of disadvantages. For one thing since it is virtually impossible to subtract all signals below the clipping level used, blue halo is still present in varying degrees. Of equal importance is the fact that such systems are still color dependent. Thus, where the keying color is blue, no other object in the foreground image may be blue in color. If individuals in the foreground image mistakenly wear blue clothing, for example, portions of the background image will be seen instead of the blue portions of their clothing.

Accordingly it would be advantageous to provide a keying system which is independent of color to the extent that any color can be used in both the foreground and background images. It would furthermore be advantageous to provide a keying system which eliminates the annoying blue halo effect. Still further advantages would be derived from a keying system which is relatively compact, lightweight, and which operates in a positive and dependable fashion, when compared with prior art systems.

BRIEF DESCRIPTION OF THE INVENTION

Unlike the prior art systems that depend on a particular color, the luminance key amplifier of the invention works on a particular property of the three color signals such as the average matrixed value thereof. Areas of the foreground signal that exceed the reference level are keyed out and a background signal is keyed in. The luminance key amplifier which compares the property of the foreground signal with a reference or threshold value, acts to switch either the foreground signal or the background signal to the output thereof, depending on the results of the comparison.

In one example of the present invention the property of the foreground signal utilized in the keying process is the average strength of the various color components comprising the foreground signal. Those areas of the foreground image which are to be keyed out in favor of the background image are illuminated to a level above that of normal white, using appropriate lighting techniques. For example in a scene in which a person or object is in front of a white background, the background may be illuminated to an intensity which is significantly greater than the intensity of normal white in the picture. The red, blue and green components of the foreground signal generated by the foreground television camera are applied to a resistor matrix within the luminance key amplifier where a signal representing the average level thereof is derived. The average signal is compared with a signal representing a level slightly greater than the level of normal white in the picture. Whenever the average signal is less than the reference level, the luminance key amplifier passes the red, blue and green components of the foreground signal to the system output, where the signals are encoded or otherwise processed. Whenever the average signal exceeds the threshold or reference level, the red, blue and green components of a background signal such as a background television camera are passed to the output.

In an alternative arrangement according to the invention, a black background is used. The average signal derive by matrixing the red, blue and green components from the foreground camera is compared with a signal representing a level approximately that of black. So long as the average signal is less than the reference level, the luminance key amplifier passes the red, blue and green components of the foreground signal to the system output. However, when the average signal is greater than the reference level, the red, blue and green components of the background signal are passed to the output.

In a preferred embodiment of the invention, each of the color components from each of the foreground and background signals is passed through an emitter follower which acts as a buffer. Signals at the outputs of the emitter followers are periodically clamped to a DC reference utilizing a clamp pulse derived from a synchronizing generator. The signals at the outputs of the various clamps are applied through delay lines to a series of video switches which control passage of the color components to the system output. Each video switch is coupled to pass the color component from the foreground signal or the keyed in background signal to the output. The state of the video switches is controlled by a comparator which compares the average matrixed signal with the reference level. In the present example the average signal level is provided by averaging the color components of the foreground signal in a resistor matrix. When the comparator determines that the average signal is greater than the reference level, indicating an area of the foreground image which is to be keyed out, the video switches are switched to an appropriate state so as to pass the color components from the background signal to the output. Whenever the average matrixed signal is less than the reference value the comparator causes the video switches to assume an appropriate state so as to pass the color components of the foreground signal to the output. Transistor logic circuitry coupled to the comparator and the video switches amplifies the output of the comparator to a level sufficient to operate the video switches. Line drivers coupled between the video switches and the output amplify the output signal to drive a low impedance line to an encoder, video tape recorder, film recorder or other device.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
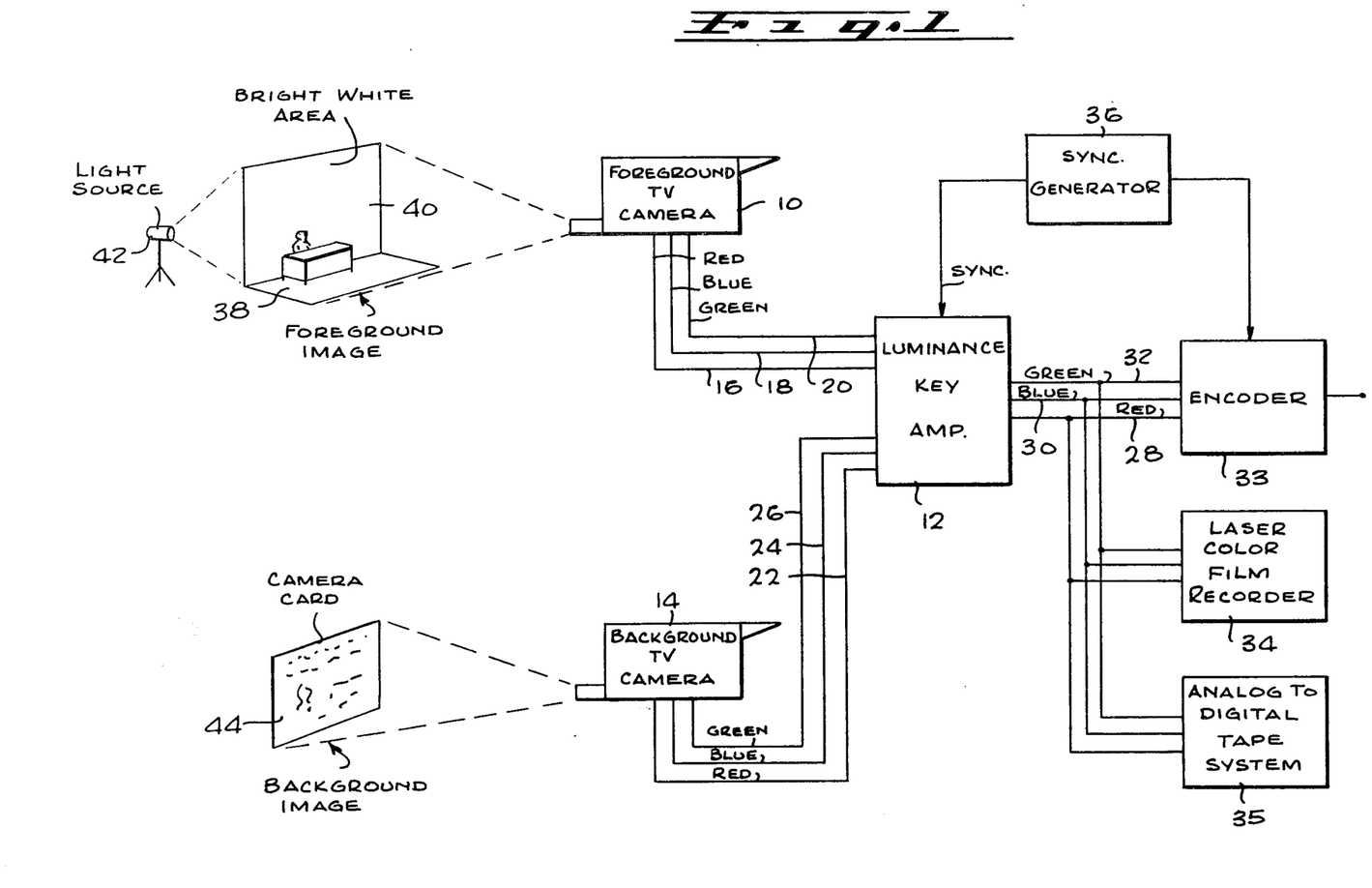
FIG. 1 is a block diagram of a keying system according to the invention.

FIG. 1 depicts a keying system in accordance with the invention as including a foreground television camera 10 coupled to a luminance key amplifier 12 together with a background television camera 14. The luminance key ampifier 12 has inputs coupled via leads 16, 18 and 20 to receive the red, blue and green signal components respectively of the video signal from the foreground camera 10. The amplifier 12 is also coupled via leads 22, 24 and 26 to receive the red, blue and green signal components, respectively, of the signal from the background camera 14. The output of the luminance key amplifier 12 is coupled via leads 28, 30 and 32 to provide the red, blue and green signal components, respectively, of a composite video signal at the amplifier output to an output device such as an encoder 33, a laser color film recorder 34, or an analog to digital tape system 35. A conventional sync generator 36 is coupled to provide sync, blanking and subcarrier signals to the encoder 33 in conventional fashion. In addition, the sync generator 36 is coupled to provide the sync pulses to the luminance key amplifier 12.

The foreground television camera 10 is directed at a foreground image 38. A portion of the foreground image 38 comprising a back wall or screen 40 in the present example is illuminated such as by use of a light source 42 to a white light intensity greater than the intensity of normal white light. As described hereafter the luminance key amplifier 12 functions to provide the video signal from the background camera 14 to the output rather than the signal from the foreground camera 10 during those portions of the video scan when the bright white area 40 of the foreground image 38 are encountered. The background camera 14 is directed at a background scene 44 which is to be inserted in place of the screen 40 of the foreground image 38 in the composite video picture.

Figure 2:
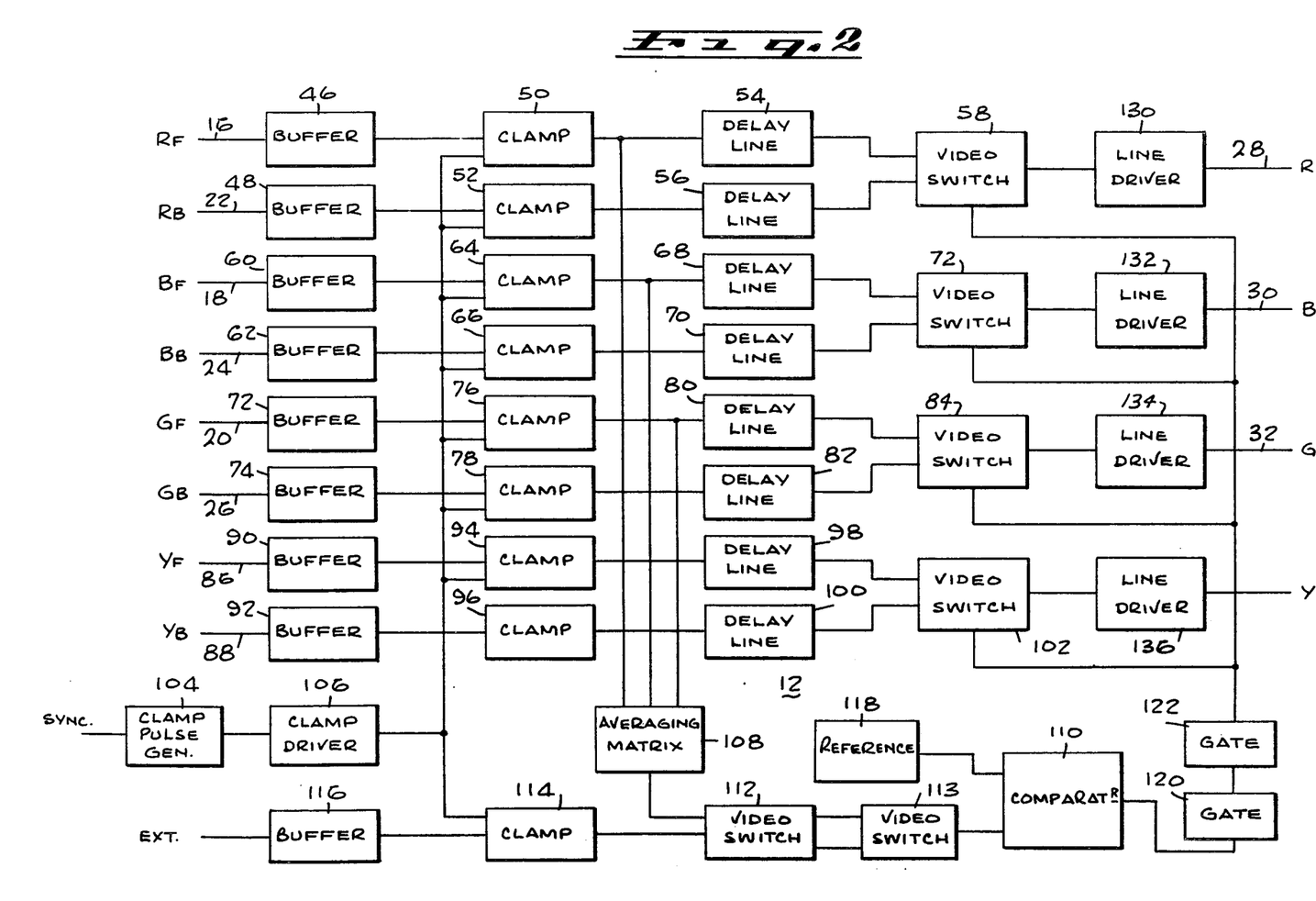
FIG. 2 is a block diagram of the luminance key amplifier of the system of FIG. 1.

The luminance key amplifier 12 is depicted in block diagram form in FIG. 2. The leads 16 and 22 carrying the red color component signals from the foreground and background cameras 10 and 14 respectively are coupled through buffers 46 and 48, clamps 50 and 52 and delay lines 54 and 56 to a video switch 58. In similar fashion the blue leads 18 and 24 are coupled through buffers 60 and 62, clamps 64 and 66, and delay lines 68 and 70 to a video switch 72. Also the green leads 20 and 26 are coupled through buffers 72 and 74, clamps 76 and 78 and delay lines 80 and 82 to a video switch 84. The particular amplifier 12 shown in FIG. 2 is also provided with a pair of input leads 86 and 88 for receiving luminance signals from the cameras 10 and 14 in those cases where 4-channel cameras are used. The leads 86 and 88 are coupled through buffers 90 and 92, clamps 94 and 96 and delay lines 98 and 100 to a video switch 102.

Since the signals on the various input leads 16, 18, 20, 22, 24, 26, 86 and 88 are AC in nature, they must be converted or otherwise DC restored for further processing. The buffers 46, 48, 60, 62, 72, 74, 90 and 92 are high input impedance emitter followers. The various clamps 50, 52, 64, 66, 76, 78, 94 and 96 are coupled to receive the clamp pulses from the sync generator 36 of FIG. 1 and a clamp driver 106. A clamp pulse generator 104 produces a clamp pulse from sync pulses and delays them so as to effectively shift the resulting pulses into the centers of the various blanking intervals. The clamp pulses as so shortened and shifted are applied via the clamp driver 106 to operate the various clamps. Each time the various clamps 50, 52, 64, 66, 76, 78, 94 and 96 are activated by the clamp driver 106, they function to clamp the various inputs thereto to a DC reference.

The signals at the outputs of the clamps 50, 64 and 76 corresponding to the red, blue and green color components respectively of the foreground signal from the camera 10 are applied to an averaging matrix 108 which functions to provide a signal representing the average intensity of the three signals to one of the inputs of a comparator 110 via video switches 112 and 113. The video switch 112 has a second input coupled through a clamp 114 and a buffer 116 for use in chroma keying or other special applications. Normally, however, the video switch functions to provide a signal corresponding to the average intensity signal from the matrix 108 and the complement to the video switch 113. The video switch 113 couples the complementary signal to the comparator 110 when a black background is used in the foreground image as described hereafter. In the present example, the video switch 113 couples the true output of the video switch 112 to the comparator 110.

The other input of the comparator 110 is coupled to a reference source 118 to receive a reference value or signal representing a level slightly higher than normal white level from the foreground image. The output of the comparator 110 is coupled through a gate 120 and through a gate 122 to the video switches 58, 72, 84 and 102 respectively. The outputs of the video switches 58, 72, 84 and 102 are respectively coupled through a plurality of line drivers 130, 132, 134 and 136.

Each of the video switches 58, 72, 84 and 102 is coupled between a signal output and a pair of inputs carrying like color signals from the two different cameras 10 and 14. The video switches are bistable and are switched to one or the other of their states by the comparator 110 to couple either the foreground signals or the background signals to the outputs. Whenever the comparator 110 determines that the average intensity signal from the matrix 108 is less than the reference value from the reference source 118, the video switches 58, 72, 84 and 102 are caused to assume an appropriate state to pass the foreground signals to the outputs. Conversely when the average intensity signal exceeds the reference signal, the various switches are switched to provide the background signals to the outputs. The gates 120, 122 amplify the signals at the output of the comparator 110 to the extent necessary to drive the various video switches 58, 72, 84 and 102. In addition the gates 120 and 122 provide for the display of the foreground and background images independently for testing purposes. The line drivers 130, 132, 134 and 136 amplify the signals to the various outputs to drive a low impedance line to an output device such as the encoder 33.

Figure 3:
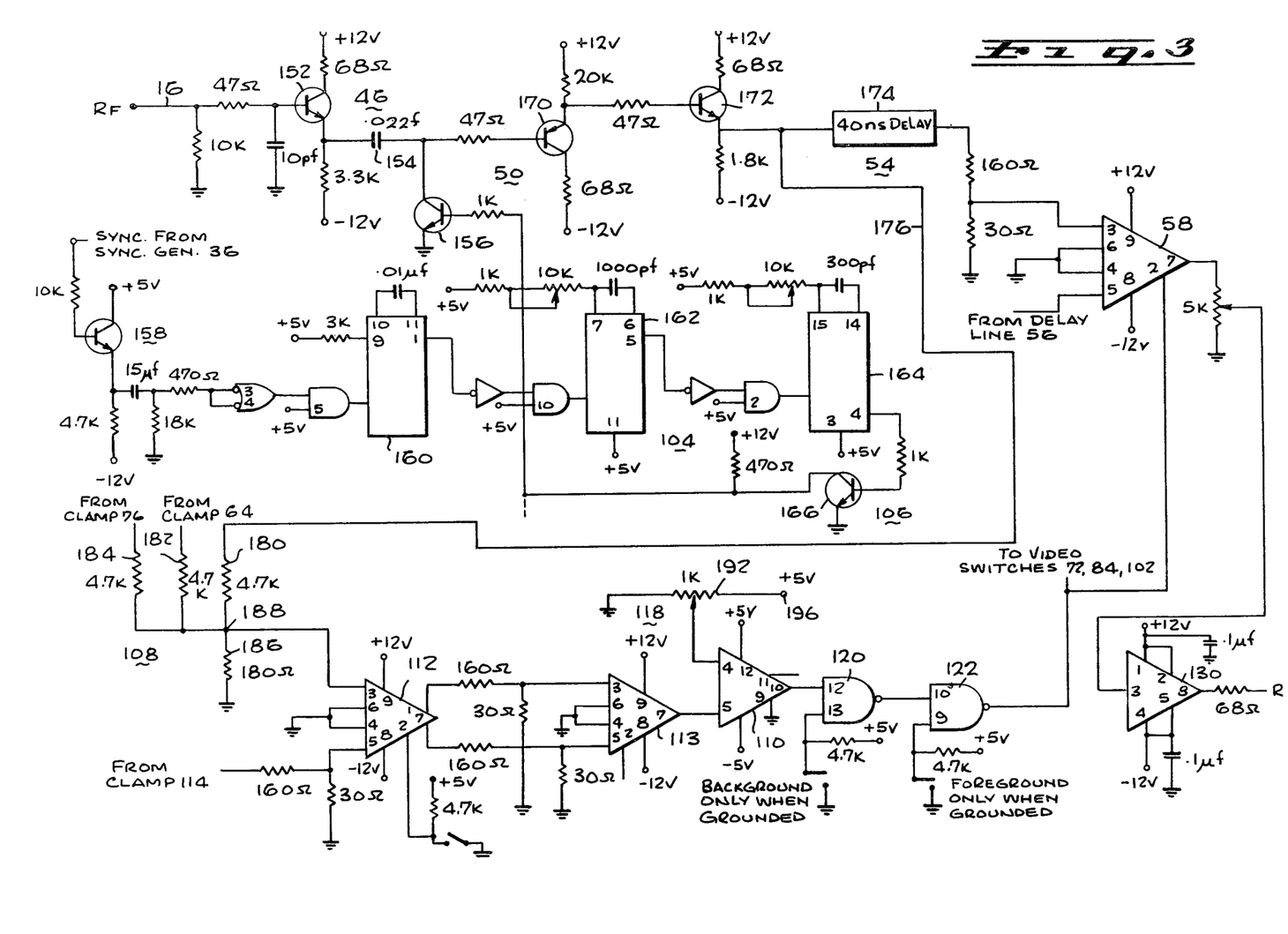
FIG. 3 is a schematic diagram of portions of the luminance key amplifier of FIG. 2.

Portions of the luminance key amplifier 12 of FIG. 2 are shown in schematic diagram form in FIG. 3. The input lead 16 is coupled to the buffer 46 which comprises an emitter follower 152. The emitter follower 152 acts as a buffer and has an output coupled through a capacitor 154 to a transistor 156 at the input of the clamp 50. The sync pulses from the sync generator 36 are applied to the clamp pulse generator 104 where clamp pulses are derived, and delayed sufficiently so as to occur at the centers of the blanking intervals. The clamp pulses are typically about 2–4 microseconds in length and occur at the beginning of a 635 microsecond interval representing one line of the video picture.

The clamp pulse generator 104 includes an emitter follower 158 which acts as a buffer and which provides protection for the input of a multivibrator 160. The multivibrator 160 is a 40 microsecond monostable multivibrator which triggers on the negative going edge of each sync pulse to blank out equalizing pulses. A second monostable multivibrator 162 triggers in response to the negative going edges of pulses from the multivibrator 160 and provides a delay pulse of 1–8 microseconds duration. A third monostable multivibrator 164 triggers in response to the negative going edges of pulses from the multivibrator 162 to provide clamp pulses of 2 microseconds duration. The clamp pulses are amplified by a transistor 166 within the clamp driver 106 prior to being passed to the various clamps 50, 52, 64, 66, 76, 78, 94 and 96. The multivibrators 160, 162 and 164 together comprise an integrated circuit sold under the designation 74121 by Texas Instruments Incorporated.

The signal at the output of the clamp 50 is applied to the delay line 54 in the form of a 40 nanosecond delay line 174 as well as via a lead 176 to the averaging matrix 108 which in the present example comprises resistors 180, 182, 184 and 186. The resistor 186 couples a common terminal 188 to ground. The resistor 180 couples the terminal 188 to the clamp 50, while the resistors 182 and 184 couple the terminal 188 to the clamps 64 and 76 respectively. The various resistors 180, 182, 184 and 186 of the matrix 108 effectively sum the three foreground signals to provide an average intensity signal to the comparator 110 via the video switch 112.

In the present example the video switches 112 and 113 comprise integrated circuits sold under the designation MC 1545 by Motorola Corporation. The comparator 110 comprises an integrated circit sold under the designation UA 760 by Fairchild Semiconductor Corporation. The reference value or signal is provided by the reference source 118 which in the present example comprises a potentiometer 192 coupled between a positive voltage terminal 196 and ground. The wiper arm of the potentiometer 192 is coupled as an input to the comparator 110.

In the present example normal white light reflected by the foreground picture produces an average signal on the order of 560 millivolts. Accordingly the resistor 192 is adjusted to provide the reference value or signal in the form of a voltage which is slightly higher than the resulting signal provided by the video switches 112 and 113 at the other input of the comparator. The screen or area 40 in the foreground image 38 of FIG. 1 is illuminated to an intensity sufficient to produce a signal at the input of the comparator 110 having a level which is at least about 15% greater than the level of the signal produced by normal white light. In the example of FIG. 1 the desired intensity is produced by normally lighting the foreground image 38 and by making the screen or area 40 assume the desired level of brightness in response to the light source 42. Of course other appropriate arrangements can be used for providing the foreground image with bright white in a selected area or areas. When the average intensity signal level from the matrix 108 is on the order of 560 millivolts or less indicating normal white light or other colors in the foreground image, the comparator 110 responds by passing the foreground signals to the outputs. However when the signal from the matrix 108 is substantially greater than 560 millivolts, the comparator 110 responds by passing the background signals to the outputs via the various video switches.

In the present example the gates 120 and 122 comprise a single integrated circuit sold under the designation SN 7400 by Texas Instruments Incorporated. The gates amplify the signals at the output of the comparator 110 to a level sufficient to operate the various video switches. In addition the gates 120 and 122 provide for the display of background and foreground individually for testing purposes. When it is desired to display the background image only, one of the inputs of the gate 120 is coupled to ground rather than to a 5 volt source. Conversely, when the foreground image only is desired for testing purposes, one of the inputs of the gate 122 is temporarily grounded.

The output of the gate 122 is applied to the video switch 58 to cause the switch 58 to assume the appropriate state. As in the case of the video switch 112 and the video switches 72, 84 and 102, the switch 58 comprises an integrated circuit sold under the designation MC 1545 by Motorola Corporation. The delay line 174 as well as the delay line 56 allow the comparator 110 to compare the average signal level with the reference and set the switch 58 before applying the ouputs of the clamps 50 and 56 to the switch 58. In this way the video switch 58 is caused to assume the proper state to pass one of the inputs thereof to the output via the line driver 130 which in this example comprises an integrated circuit sold under the designation LH 0002 CH by National Semiconductor Corporation.

The circuitry comprising the buffer 46, the clamp 50 and the delay line 54 in FIG. 3 is repeated for the various other input leads, and is not shown in FIG. 3 for reasons of brevity. Likewise the line drivers 132, 134 and 136 comprise the same circuitry as that shown in FIG. 3 for the driver 130. In the particular example of FIG. 3 all NPN transistors are of the MPS 6521 type. All PNP transistors are of the MPS 6523 type. The cameras 10 and 14 may be any appropriate 3-tube or 4-tube type. An example of an appropriate 3-tube camera is the Norelco PC 70. A 4-tube camera may be of the KCU-40 type made by Fernseh.

Figure 4:
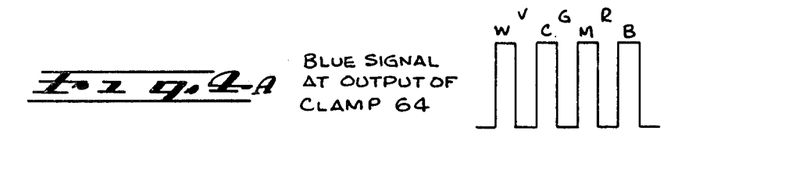
FIGS. 4A-4E are diagrammatic waveforms useful in explaining the operation of the luminance key amplifier of FIG. 2.

FIGS. 4A-4E depict waveforms illustrating the operation of the circuit of FIGS. 2 and 3. FIG. 4A shows the blue signal portion of a standard color bar as it appears at the output of the clamp 64. Similarly FIGS. 4B and 4C show the red and green signal portions respectively, corresponding to the standard color bar. When the three waveforms are summed together and divided by three by the matrix 108 the resulting signal at the positive output of the video switch 112 is shown in FIG. 4D together with the reference level provided by the circuit 118. The portion of the composite signal corresponding to white exceeds the reference level while the portions corresponding to yellow, cyan, green, magenta, red and blue are less than the reference level. Accordingly, the signals from the background camera 14 are gated to the output in the presence of the white, while the signals from the foreground camera 10 are gated to the output in the presence of the other colors.

In the example of FIG. 4E the system keys in response to black or very dark colors of low illumination instead of white of high illumination. The video switch 113 is employed to pass the negative rather than the positive output of the video switch 112 to the comparator 110, the negative output being shown in FIG. 4E against the reference level provided by the circuit 118. Whenever black or other situations of very low intensity are present, the reference signal is less than the composite signal, causing the signals from the background camera 14 to be passed to the output. Otherwise, as when any of the colors of the color bar are present, the reference level exceeds the composite signal and the signals from the foreground camera 10 are passed to the output.

It will therefore be appreciated that systems in accordance with the invention are not color dependent as in the case of many prior art systems, but instead respond to the relative level of signals provided by an averaging matrix. Accordingly any color can be used in the foreground image. Furthermore, the portion of the foreground image to be keyed out can be of virtually any color so long as the relative intensity thereof is at an appropriate level.

Still further advantages of the invention will be appreciated by those skilled in the art. Thus due to the nature of signal averaging and comparison as well as the fact that the video signals are keyed prior to encoding, no blue halo effect results. A white background produced neutral flare, while a black background produces no flare at all. The keyed signals are still separated into the three color components in an unencoded form, and can therefore be directly applied to a variety of different devices such as the laser color film recorder 34 or the analog to digital tape system 35. One example of a laser color film recorder is provided by FIG. 7 of the previously referred to U.S. Pat. No. 3,778,542 of Hanseman. The analog to digital tape system 35 may comprise an analog to digital converter to convert the incoming video signals to corresponding digital signals and a video tape system for recording the digital signals for later use. Animation is also made simple by the invention, since the animation can be drawn on white paper. By illuminating the animated pictures to the extent necessary to provide the white background with high intensity it is then a simple matter to key the animation over any desired background as provided by the background camera.

While the invention has been particularly shown and described with reference to a preferred embodiment thereof, it will be understood by those skilled in the art that various changes in form and details may be made therein without departing from the spirit and scope of the invention.

What I desire to claim and secure by letters patent is:

1. An arrangement for keying video signals comprising:
   a first video signal source for providing a first video signal having a plurality of color components and which components of said first video signal are present in various proportions relating to the presence of colors in the first video signal source and which represent a first visual image;
   a second video signal source for providing a second video signal representing a second visual image; and
   keying means coupling together substantially equal proportions of the components of said first video signal source to the extent that the components of said first video signal are present and providing a signal representative of the average of the components of the first video signal, means to receive the coupled components of the first video signal for comparing the average intensity of the coupled components of the first video signal with a reference, said means for comparing being operative to pass the first video signal to an output to the exclusion of the second video signal when the average intensity of the coupled components of the first signal assumes a first relationship with respect to the reference and to pass the second video signal to the output to the exclusion of the first video signal when the average intensity of the coupled components of the first video signal assume a second relationship with respect to the reference.

2. The invention defined in claim 1, wherein said components of said first video signal comprise red, blue and green components, and the means for keying includes means responsive to the red, blue and green components for determining the average intensity thereof.

3. An arrangement for keying video signals comprising:
   a first video signal source for providing a first video signal having a plurality of color components including at least red, blue and green components present in various proportions relating to the presence of said colors in the first video signal source and representing a first visual image, the first signal having a property based on the matrixed components thereof which is variable in accordance with desired keying of the first visual image;
   a second video signal source for providing a second video signal representing a second visual image; and
   keying means coupling together substantially equal proportions of the plurality of components of the first video signal to the extent that the coupled components are present and providing a signal representative of the average of the components of the first video signal, means to receive the coupled components of the first video signal for comparing said coupled components representing said property of the first video signal with a reference, said means for comparing being operative to pass the first video signal to the output to the exclusion of the second video signal when said property of the first signal assumes a first relationship with respect to the reference and to pass the second video signal to the output to the exclusion of the first video signal when said property of the first video signal assumes a second relationship with respect to the reference;
   said property of the first video signal being proportional to the intensity of the matrixed components of the first visual image, and portions of the first visual image which are to be replaced by the second visual image by illuminating the first visual image so as to have a greater than threshold intensity.

4. An arrangement for keying color television images comprising:
   a first color television camera for providing red, blue and green signals representing a first image;
   a second color television camera for providing red, blue and green signals representing a second image;
   means for averaging the strength of the red, blue and green signals from the first camera;
   means for providing a reference signal;
   means for comparing the average strength of the red, blue and green signals from the first camera with the reference signal to determine which is larger; and
   switching means coupling the first and second cameras to an output and responsive to the comparing means to apply the red, blue and green signals of the first camera to the output whenever the average strength of the red, blue and green signals from the first camera assumes a first relationship relative to the reference signal and to apply the red, blue and green signals from the second camera to the encoding means whenever the average strength of the red, blue and green signals from the first camera assumes a second relationship relative to the reference signal.

5. The invention defined in claim 4, further including sync generator means for providing a sync signal, and means responsive to the sync signal and to the red, blue and green signals from the first and second cameras for clamping the red, blue and green signals from the first and second cameras to a DC reference.

6. The invention defined in claim 4, further including means for illuminating portions of the first image to key in the second image, by an intensity sufficient to provide the red, blue and green signals from the first camera with an average level greater than that of the reference signal, and wherein the switching means is operative to apply the red, blue and green signals of the first camera to the output whenever the average of the red, blue and green signals from the first camera is less than the level of the reference signal and to apply the red, blue and green signals from the second camera to the output whenever the average level of the red, blue and green signals from the first camera is greater than the level of the reference signal.

7. The invention defined in claim 4, wherein the switching means is operative to apply the red, blue and green signals of the first camera to the output whenever the average level of the red, blue and green signals from the first camera is greater than the level of the reference signal and to apply the red, blue and green signals from the second camera to the output whenever the average level of the red, blue and green signals from the first camera is less than the level of the reference signal.

8. A color video keying circuit comprising:
   means responsive to the color components of a first video signal for determining the average value thereof;
   means providing a reference value;
   means for comparing the average value of the color components of the first video signal with the reference value;
   output means;
   first switching means responsive to the means for comparing for passing the color components of the first video signal to the output means whenever the average value of the color components of the first video signal assumes a first relationship with respect to the reference value; and
   second switching means responsive to the means for comparing for passing the color components of a second video signal to the output means whenever the average value of the color components of the first video signal assumes a second relationship with respect to the reference value.

9. The invention defined in claim 8, wherein the first and second video signals each comprise a luminance component in addition to the color components thereof, the luminance components of the first and second video signals being passed to the output means by the first and second switching means in the same manner as are the color components of the first and second video signals.

10. The invention defined in claim 8, wherein the means for determining the average value of the first video signal comprises a matrix of resistors.

11. A color video keying circuit comprising:
plural pairs of inputs, each pair of inputs being adapted to receive color signals from different video cameras;
means coupled to a first input of each pair for determining the average value of the color signals thereat;
a plurality of outputs, each associated with a different pair of inputs;
a plurality of switches, each coupled between a different one of the outputs and a pair of inputs associated with the output, and being switchable between opposite states to couple the first or the second input of the pair of inputs to the output;
means for providing a reference value;
means for comparing the reference value and said average value; and
means responsive to the means for comparing for switching the switches between the opposite states depending on whether said average value is greater than or less than the reference value.

12. The invention defined in claim 11, further including means coupled to the pairs of inputs for clamping the color signals relative to a DC reference.

13. The invention defined in claim 12 wherein the means for clamping includes means for generating clamp pulses, means for delaying the clamp pulses a selected amount, and means for clamping the color signals relative to a DC reference in response to each delayed clamp pulse.

14. The invention defined in claim 12 further including means coupled to the pairs of inputs for buffering the incoming color signals.

15. The invention defined in claim 11, further including delay line means coupled between the switches and the clamping means for delaying passage of signals from the clamping means to the switches by a time sufficient to allow the means for comparing to compare the reference value and said average value after clamping of the color signals and the switches to assume a selected state in response to the means for clamping.

16. An arrangement for processing video signals comprising:
a first video signal source for providing a first video signal comprised of a plurality of components representing a first visual image;
a second video signal source for providing a second video signal representing a second visual image;
means for determining the average intensity of the components of the first video signal;
output means; and
means for controlling passage of the first and second video signals to the output means in accordance with the average intensity of the components of the first video signal.

17. The invention defined in claim 16, wherein the components of the first video signal comprise red, blue and green components and the means for determining the average intensity averages of the intensity of the red, blue and green components.

18. An arrangement for processing a video signal comprising means for providing a video signal having a plurality of different color components initially present in various proportions relating to the presence of colors in a source which provided such video signal, means responsive to the video signal for generating a matrixed signal from substantially equal proportions of the components representing the average intensity of the color components of the video signal to the extent that the color components of said signal are present, signal generating means for generating a reference signal independently of the color components, and comparator means for receiving the matrixed signal and the reference signal and comparing the matrixed signal to the reference signal and generating an output when the matrixed signal assumes either a first or a second relationship with respect to said reference signal.

19. The invention defined in claim 18, wherein the means for generating the matrixed signal representing the average intensity includes plural means for generating signals representing the intensity of the color components of the video signal, means for adding together the signals representing the intensity of the color components of the video signal to provide a combined signal, and means for dividing the combined signal by the number of color components to provide the signal representing the average intensity of the color components of the video signal.

20. The invention defined in claim 18, wherein the means for generating the matrixed signal representing the average intensity of the color components of the video signal comprises a common terminal, a plurality of resistors coupled to the common terminal and each coupled to receive a different one of the color components, and a resistor coupling the common terminal to a reference providing said reference signal, the common terminal providing the matrixed signal representing the average intensity of the color components of the video signal.

21. A circuit for processing a video signal comprising means for clamping the circuit relative to a DC reference, a plurality of input terminals adapted to receive the different color components of the video signal which are present in various proportions relating to the presence of colors in a source which provided the video signal, an output terminal, buffer amplifier means coupled to receive the different color components, means coupling the outputs of the buffer amplifier means to said means for clamping for restoring a DC reference level, and means responsive to the different color components for generating a signal representing the average strength of the different color components such that the color components are present in substantially equal porportions, said last-named means including means to generate a reference signal and a comparator means to receive the reference signal and a signal representative of the average of the color components and comparing the signal representation of the average against the reference signal, the signal representing the average strength of the different color components being applied to the output terminal.

22. An arrangement for keying video signals comprising:
a first video signal source comprised of red, blue and green components for providing a first video signal representing a first visual image;
a second video signal source for providing a second video signal representing a second visual image; and
keying means coupling the first and second video signal sources to an output and including means for comparing the average intensity of the first video signal responsive to the red, blue and green components thereof with a reference, said keying means being operative to pass the first video signal to the output to the exclusion of the second video signal when the average intensity of the first signal assumes a first relationship with respect to the reference and to pass the second video signal to the output to the exclusion of the first video signal when the average intensity of the matrixed components of the first video signal assumes a second relationship with respect to the reference.

* * * * *